United States Patent
Higley et al.

(10) Patent No.: US 11,397,298 B2
(45) Date of Patent: Jul. 26, 2022

(54) ADAPTER TO JACKETED FIBER INTERFACE

(71) Applicant: US Conec, Ltd, Hickory, NC (US)

(72) Inventors: Jason Higley, Hickory, NC (US); Michael E. Hughes, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/887,929

(22) Filed: May 29, 2020

(65) Prior Publication Data

US 2020/0379190 A1 Dec. 3, 2020

Related U.S. Application Data

(60) Provisional application No. 62/854,842, filed on May 30, 2019.

(51) Int. Cl.
*G02B 6/38* (2006.01)

(52) U.S. Cl.
CPC ......... *G02B 6/3887* (2013.01); *G02B 6/3825* (2013.01)

(58) Field of Classification Search
CPC .............................. G02B 6/3887; G02B 6/3825
USPC ......................................................... 385/139
See application file for complete search history.

(56) References Cited

U.S. PATENT DOCUMENTS

| | | | | | |
|---|---|---|---|---|---|
| 5,076,656 | A | * | 12/1991 | Briggs | H01R 13/447 385/71 |
| 5,613,025 | A | * | 3/1997 | Grois | G02B 6/3831 385/53 |
| 5,915,058 | A | * | 6/1999 | Clairardin | G02B 6/3825 385/77 |
| 6,017,154 | A | * | 1/2000 | Carlisle | G02B 6/3869 385/86 |
| 6,456,768 | B1 | * | 9/2002 | Boncek | G02B 6/3817 385/100 |
| 6,543,941 | B1 | * | 4/2003 | Lampert | G02B 6/4293 385/58 |
| 6,588,938 | B1 | * | 7/2003 | Lampert | G02B 6/3817 385/58 |
| RE43,221 | E | | 3/2012 | James et al. | |
| 9,063,303 | B2 | * | 6/2015 | Irwin | G02B 6/3885 |
| 9,104,007 | B2 | | 8/2015 | James et al. | |
| 9,395,509 | B2 | * | 7/2016 | Petersen | G02B 6/4471 |
| 9,417,420 | B2 | | 8/2016 | Fisher et al. | |
| 10,656,360 | B2 | * | 5/2020 | Sedor | G02B 6/245 |
| 2007/0036487 | A1 | * | 2/2007 | Grzegorzewska | G02B 6/3825 385/53 |
| 2011/0019964 | A1 | * | 1/2011 | Nhep | G02B 6/3825 385/135 |

(Continued)

OTHER PUBLICATIONS

HellermanTyton, RapidNet Fiber LC Cassette to LC Cassette, Aug. 3, 2017.

*Primary Examiner* — Kaveh C Kianni
(74) *Attorney, Agent, or Firm* — Michael L. Leetzow, P.A.; Shubhrangshu Sengupta

(57) ABSTRACT

An interface provides protection and support for transitioning a jacketed fiber optic cable. The interface has a crimp body, a transition portion and a front end to receive an adapter. The interface preferably has a main body with two pieces that are identical. The two pieces have tabs and recesses corresponding to the tabs for alignment and structure. The main body also may have an opening for an adapter latch. A crimp band fits over the crimp body to secure the jacketed fiber optic cable to the interface.

12 Claims, 11 Drawing Sheets

(56) References Cited

U.S. PATENT DOCUMENTS

| | | | |
|---|---|---|---|
| 2012/0076459 A1* | 3/2012 | Sell | G02B 6/3879 |
| | | | 385/76 |
| 2012/0257859 A1* | 10/2012 | Nhep | G02B 6/38875 |
| | | | 385/81 |
| 2013/0039623 A1* | 2/2013 | Zhang | H04Q 1/06 |
| | | | 385/73 |
| 2013/0163934 A1* | 6/2013 | Lee | G02B 6/3879 |
| | | | 385/78 |
| 2014/0082913 A1* | 3/2014 | Marcouiller | G02B 6/3874 |
| | | | 29/426.1 |
| 2016/0116685 A1* | 4/2016 | Wong | G02B 6/3897 |
| | | | 385/56 |
| 2017/0227720 A1* | 8/2017 | Lin | G02B 6/3879 |
| 2019/0154930 A1* | 5/2019 | Ho | G02B 6/3887 |
| 2019/0204513 A1* | 7/2019 | Davidson | G02B 6/3825 |
| 2020/0064564 A1* | 2/2020 | Ho | G02B 6/3893 |
| 2020/0081195 A1* | 3/2020 | Ho | G02B 6/3869 |
| 2020/0124816 A1 | 4/2020 | Berridge | |
| 2020/0150353 A1* | 5/2020 | Wong | G02B 6/3849 |
| 2020/0271867 A1* | 8/2020 | Ishikawa | G02B 6/3831 |
| 2020/0310041 A1* | 10/2020 | Chang | G02B 6/3887 |
| 2020/0333537 A1* | 10/2020 | Gniadek | G02B 6/3825 |

* cited by examiner

ADAPTER TO JACKETED FIBER INTERFACE

REFERENCE TO RELATED CASE

This application claims priority under 35 U.S.C. § 119 (e) to provisional application No. 62/854,842 filed May 30, 2019, the contents of which are hereby incorporated by reference in their entirety.

BACKGROUND OF THE INVENTION

It is common in the industry for outdoor applications to have a large optical fiber bundle cable with many hundreds of jacketed optical fiber cables branch out into smaller groups of jacketed fiber cables. Such branching into smaller optical fiber cable groups are carried out as many times as needed until individual jacketed optical fiber cables have one, two, or more optical fibers inside that are then, in-turn, terminated with fiber optic connectors. An example application where this is done is with Fiber-To-The-Home (FTTH) technology.

Currently, a hardened fiber optic connector is used with the jacketed optical fiber cables in the smaller optical fiber cable groups that branch out from a bigger cable, for example in an outdoor FTTH environment. The hardened fiber optic connectors provide mechanical support and environmental protection for the optical fiber cable groups.

Hardened connectors are expensive and are not very practical in certain environments, especially the indoor environment. In indoor environments, such as in a data center, fiber optic connections are point-to-point with standard terminations at each end. The point-to-point fiber optic cables are supported by racks and trays. This requires handling or managing of multiple cable assemblies. A way is needed to handle the multiple optical fiber connectors that terminate the optical fiber cable groups without the need for hardened fiber optic connectors, and yet still provide that mechanical support and environmental protection in the indoor environment. An interface is disclosed herein that provides the mechanical support and environmental protection to the individual jacketed optical fiber cables broken out from the bigger optical cable.

SUMMARY OF THE INVENTION

The present invention is directed to an interface for transitioning a jacketed fiber optic cable to an adapter, the adapter configured to mate at least one pair of optical fibers, the interface including a main body having a front end mateable with the adapter and a back end configured to receive the jacketed fiber optic cable, the main body having an interior opening extending between the front end and the back end, a crimp body disposed at the back end of the main body configured to support the jacketed fiber optic cable at the back end; and a transition area disposed between the front end and the back end of the main body.

In some embodiments, the interface also includes at least one latch opening disposed in the main body to receive at least one latch on the adapter to connect the interface to the adapter.

In some embodiments, there is a first latch mechanism and a second latch mechanism on each of the first and second pieces, wherein the first latch mechanism faces away from the internal opening and second latch mechanism faces toward the internal opening.

In some embodiments, the main body comprises a first piece and a second piece, the first piece and the second piece are mateable to one another.

In other embodiments, the first piece has a first tab recess and a first tab and the second piece has a second tab recess and a second tab, where in the second tab is aligned with the first tab recess and the first tab is aligned with the second tab recess.

In other embodiments, the main body is connected to the jacketed fiber optic cable with a crimp band over the crimp body.

In yet another aspect, the invention is directed to a two-piece interface to be disposed between an adapter and a jacketed fiber optic cable that includes a first piece having a first latch and a first latch recess, and a second piece having a second latch and a second latch recess, wherein the first latch is mateable to the second latch recess and the second latch is mateable with the first latch recess to form a main body of the interface, and wherein the mated first and second pieces form a crimp body at a back end of the main body configured to support the jacketed fiber optic cable.

In other embodiments, the first piece and the second piece are identical to one another.

In yet another aspect, the present invention is directed to a method of strain relieving a jacketed fiber optic cable branching from a larger fiber optic cable bundle that includes inserting the jacketed fiber optic cable into a crimp portion of an interface, transitioning individual fiber optic cables of the jacketed fiber optic cable to a plurality of connectors within a transitioning area inside the interface, and mating the interface to an adapter holding at least a pair of mating connectors.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
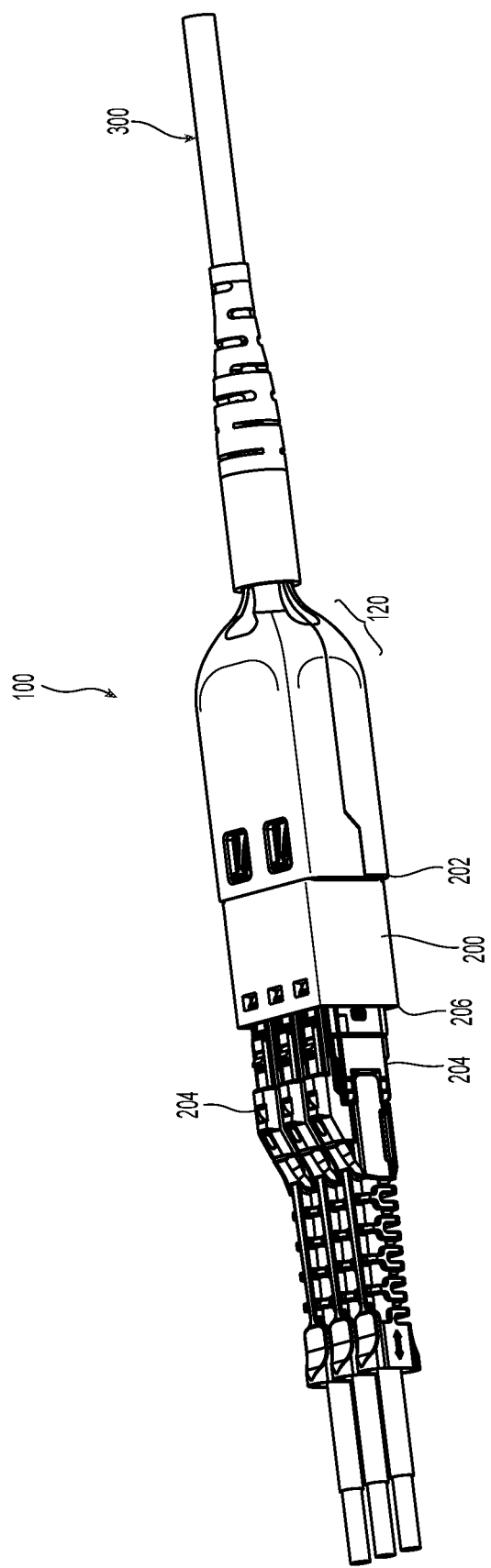
FIG. 1 is a perspective view of one embodiment of an interface according to the present invention attached to an adapter with a plurality of fiber optic connectors disposed in the adapter.

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of an interface 100 is illustrated in FIG. 1. The interface 100 is attached to an adapter 200 at a first end 202, the adapter also having connectors 204 that are inserted into the adapter 200 from an opposing end 206. The connectors 204 are preferably duplex connectors, such as MDC connectors available from the applicant US Conec, Ltd. In FIG. 1 three such duplex connectors are illustrated. However, other fiber optic connectors could be used with the adapter 200 and still fall within the scope of the present invention. The interface 100 is designed to terminate a jacketed fiber optic cable 300. As is known, the jacketed fiber optic cables 300 will typically have a strength member disposed within the jacket (along side the optical fibers) to allow for strain relief at the termination point. In the example illustrated in FIG. 1, the jacketed fiber optic cable 300 will have 6 optical fibers to be terminated and connected to the 6 optical fibers in the three duplex connectors 204.

FIGS. 2-8 illustrate one preferred embodiment of the interface 100 according to the present invention. The interface 100 has a main body 102 that has a front end 104 mateable with the adapter 200 (see FIG. 1) and a back end 106 configured to receive the jacketed fiber optic cable 300. The main body 102 preferably comprises two pieces, a first piece 108 and a second piece 110. Preferably the two pieces 108 and 110 have the same configuration—they are identical except that one is inverted and attached to the other. Adjacent the front end 104 of the interface are two latch openings 112 to engage latches that are present on the adapter 200. It should be noted that these two elements may be reversed in that there may be adapter latches on the interface 100 and the adapter 200 would have openings to receive the latches on the interface. Alternatively, the latches and latch openings could also be disposed on the sides, rather than on the top and bottom as illustrated.

When the two pieces 108, 110 are connected to one another, as described in more detail below, they form an interior opening 114 extending between the front end 104 and the back end 106. The back end 106 of the interface 100 also forms a crimp body 116. The crimp body 116 is preferably round (when the two pieces 108, 110 are connected to one another) but may have any other functional shape (i.e., oval, hexagonal, etc.). Additionally, the crimp body 116 may be larger or smaller, depending on the number of jacketed fiber optic cables 300, the number of optical fibers in each of the jacketed fiber optic cables 300, etc. The crimp body 116 receives a crimp band 118, which is crimped to the crimp body 116, to secure a strength member from the jacketed fiber optic cable 300 to the interface 100. See, e.g., FIG. 8. In this way, the crimp body 116 supports the jacketed fiber optic cable 300 at the back end 106 of the interface 100.

The interface 100 also has a transition area 120 disposed between the front end 104 and the back end 106 of the main body 102. In this transition area 120, the optical fibers in the jacketed fiber optic cable 300 can be arranged and oriented to be connected with the appropriate fiber optic connector 204 and without bending the optical fibers. Each of the first and second pieces 108,110 have a central portion 122 and two walls 124, 126 that are on opposite sides of the central portion 122. It is noted that the two latch openings 112 disposed in the central portion 122. The transition area 120 has a cross section that is larger than that of the crimp body 116, but smaller than the central portion 122. In this regard, the transition area 120 aids the optical fibers to transition from a denser arrangement inside the crimp body 116 to a more spaced-out arrangement inside connectors (not shown) in the interior opening 114 closer to the front end 104.

Figure 2:
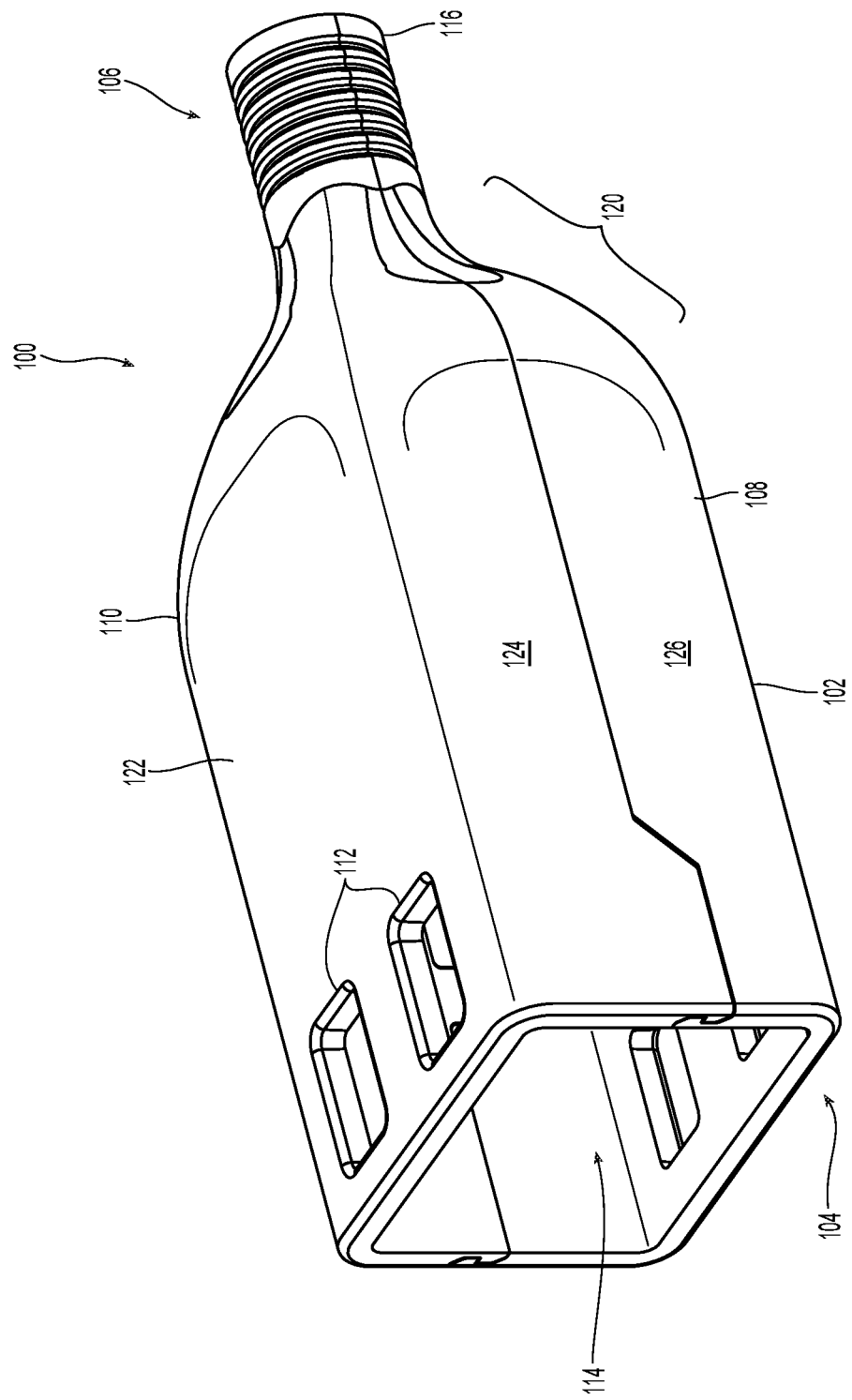
FIG. 2 is a perspective view of the interface of FIG. 1.
Figure 3:
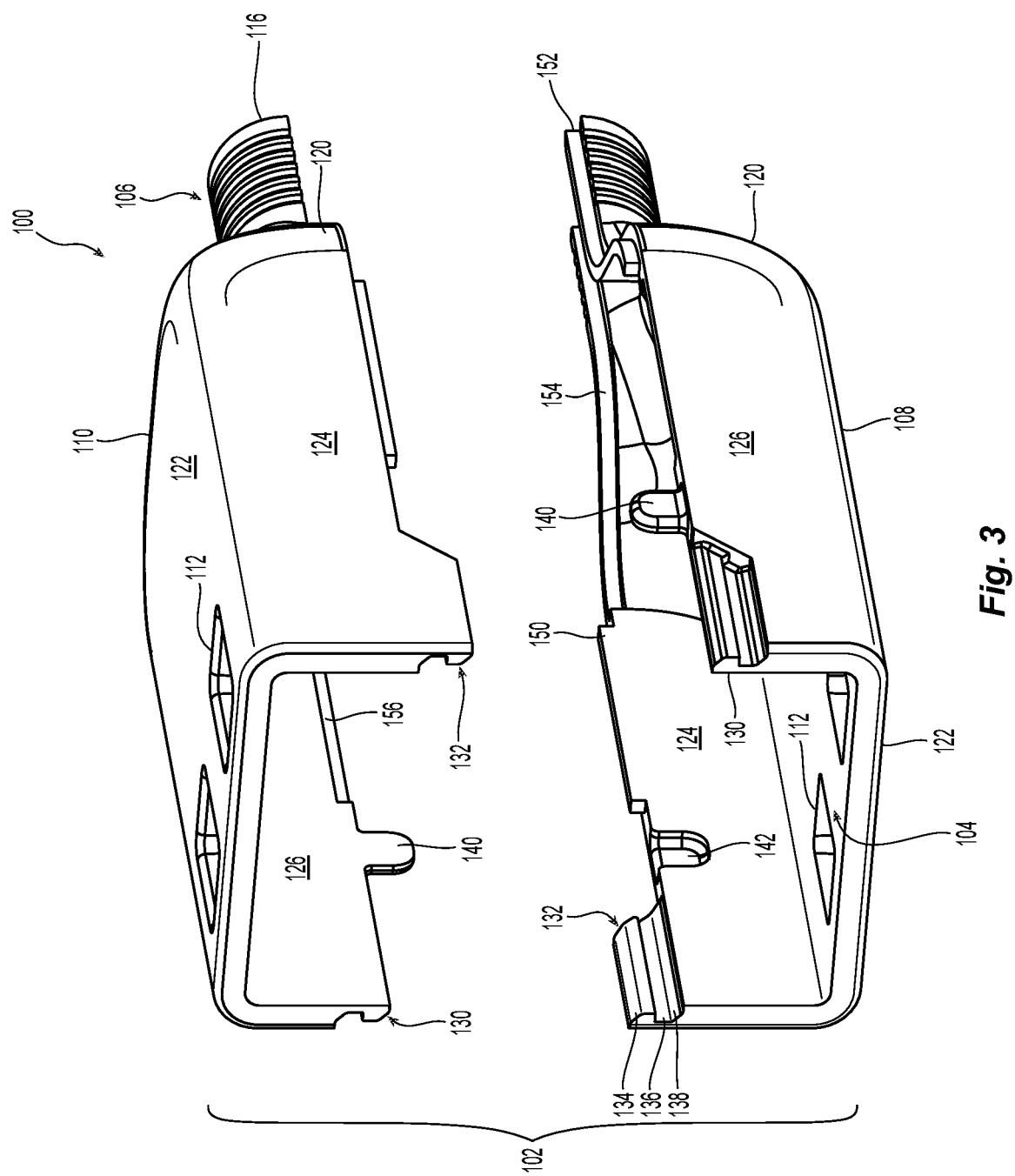
FIG. 3 is a perspective view of the interface of FIG. 1 separated into its two pieces.
Figure 4:
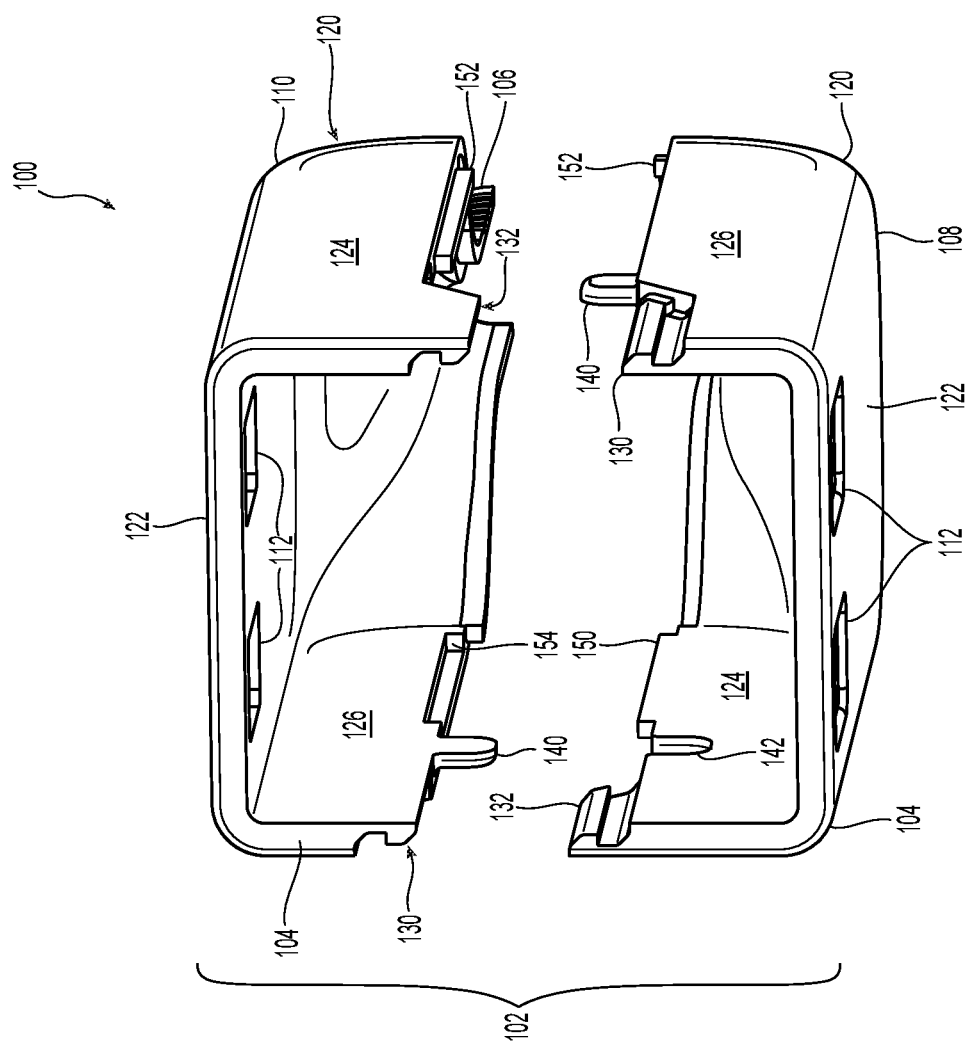
FIG. 4 is a front perspective view of the adapter illustrated in FIG. 3.
Figure 5:
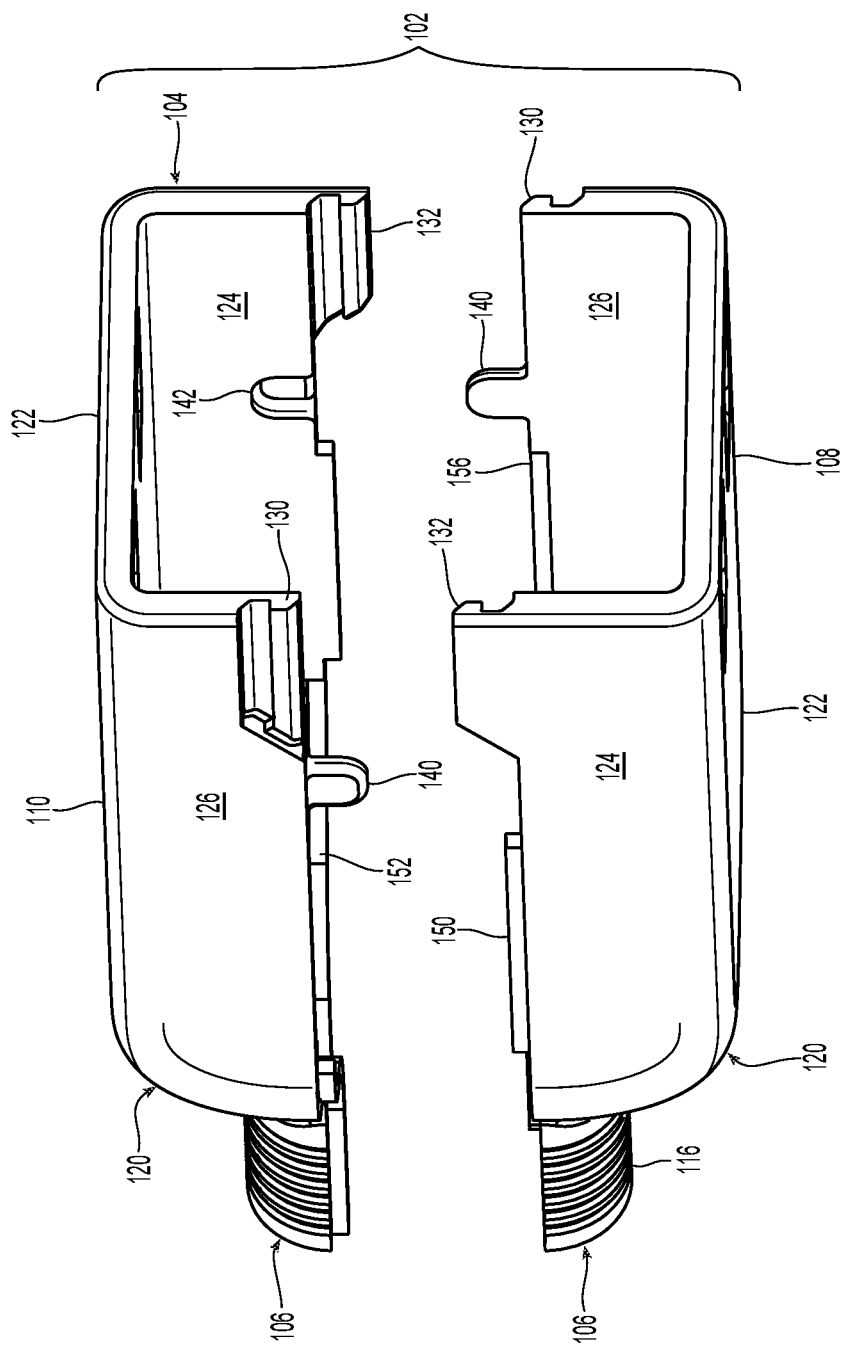
FIG. 5 is a right side perspective view of the interface of FIG. 1.

Each of the first and second pieces 108,110 have a first latch mechanism 130 and a second latch mechanism 132 that extend from the walls 124,126. Each of the latch mechanisms 130,132 are the same since each of the pieces 108, 110 are the same. The latch mechanisms 130,132 have an upper chamfered portion 134 that leads to a flat outer surface 136 and then an undercut portion 138 that is configured to receive the chamfered portion 134 and the flat surface 136 of the corresponding latch mechanism on the other of the first and second pieces 108, 110. As can be readily discerned, the latch mechanisms 130,132 face the same way on each of the first and second pieces 108,110. That is latch mechanism 130 has the chamfered portion 134 and the flat surface 136 facing away from the interior opening 114, while the latch mechanism 132 has the chamfered portion 134 and the flat outer surface 136 facing toward the interior opening 114. As the first piece 108 is moved toward the second piece 110, the chamfered portions 134 from latch mechanisms 130,132 engage one another and flex away allowing the flat surfaces 136 to move past one another and move into the undercut portion 138. Thus, the two pieces 108,110 then form the main body 102 as illustrated in FIG. 2.

To assist in aligning the first and second pieces 108,110, each of the first and second pieces 108,110 have a tab 140 and a tab recess 142. The tab 140 on each of the first and second pieces 108,110 fits within the tab recess 142 on the other piece. As illustrated best in FIGS. 4 and 5, the tabs 140 extend from the wall 122 away from the central portion 120. The tab recesses 142 are disposed in walls 124 and are preferably open and in communication with the interior opening 114. However, the tab recesses 142 could also be closed and separate from the interior opening 114.

Figure 6:
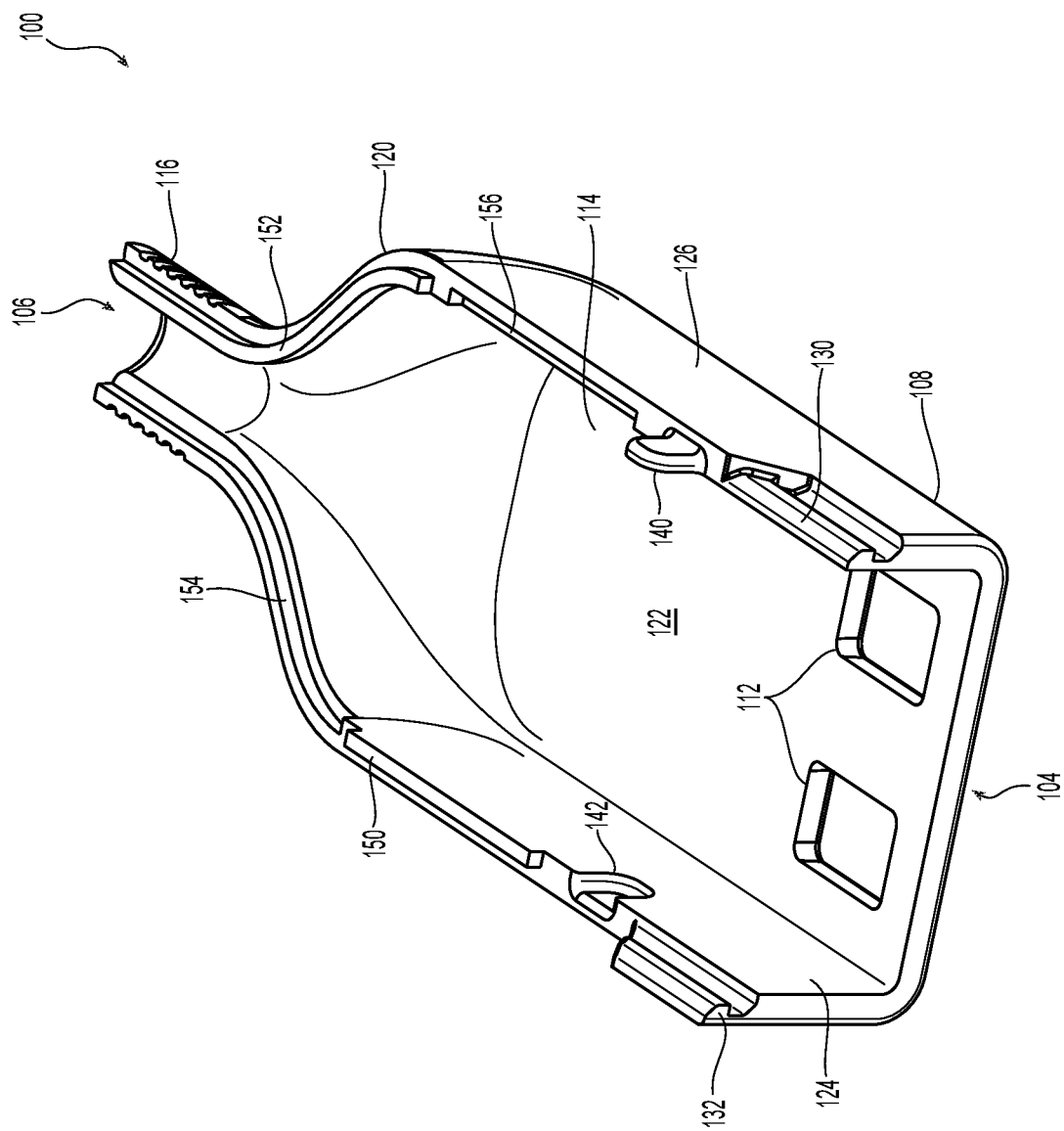
FIG. 6 is a perspective view from the top of the bottom piece of the interface in FIG. 3.
Figure 7:
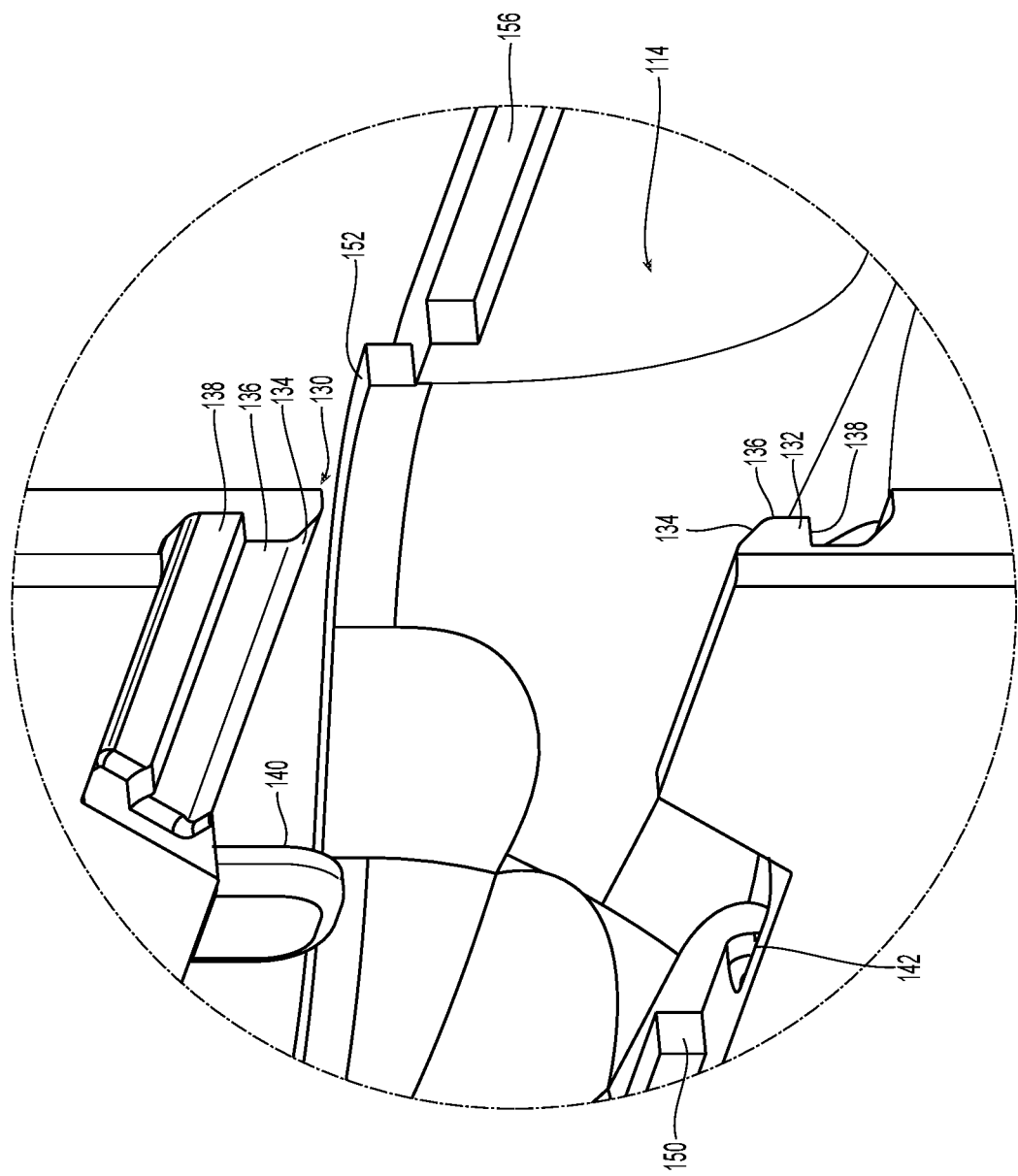
FIG. 7 is an enlarged view of the latch on the interface in FIG. 1.

Turning to FIG. 6, each of the first and second pieces 108,110 have on the walls 124,126 a series of projections 150,152 and recesses 154,156 to assist in aligning the first and second pieces 108,110 as well as the walls 124, 126. Each of the projections 150,152 and recesses 154,156 are preferably about half of the width of the walls 124, 126, but could have other dimensions and positions along the walls 124,126. For example, in FIG. 6, the wall 124 has a projection 150 that begins behind the tab recess 142 and runs to the transition area 120. Then, there is a recess 154 that continues along the wall 124 to the back end 106. On the wall 126 on the other side of one of the pieces, there is a recess 156 that begins behind the tab 140 and continues to the transition area 120. Then there is a projection 152 that extends from the transition area 120 to the back end 106. The projection 150 from wall 124 is received in the recess 152 in wall 126 and the projection 152 is received within the recess 154.

Figure 8:
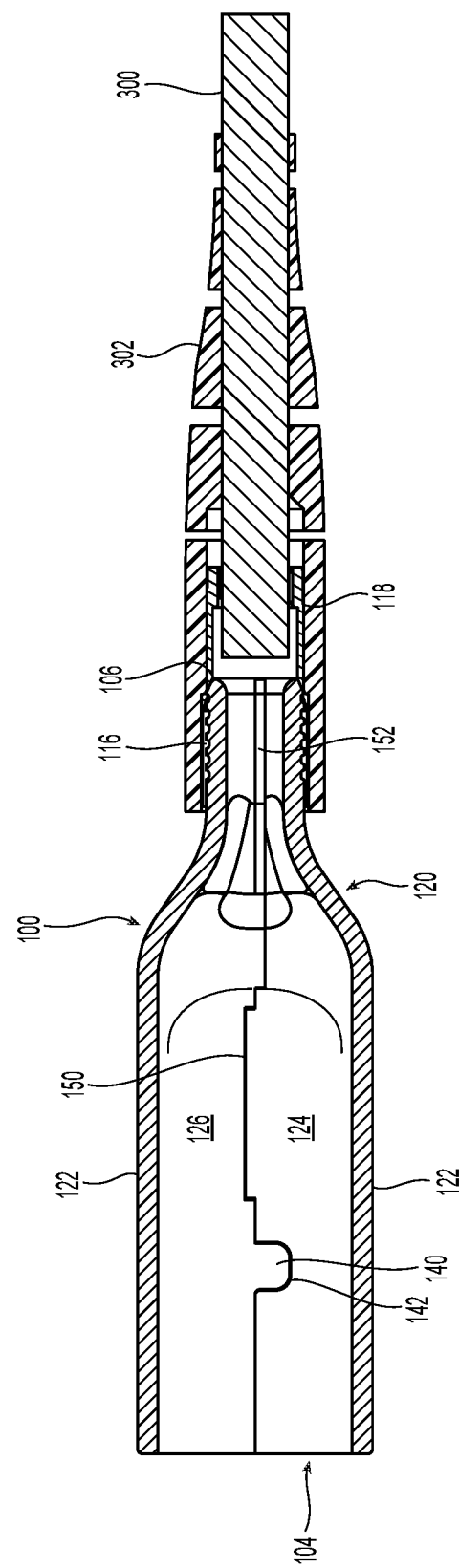
FIG. 8 is a cross section view of the interface and adapter in FIG. 1 along the lines 8-8.

With reference to FIG. 8, there is illustrated the assembled interface 100, with the two pieces 108,110 assembled to make the main body 102. Additionally, the crimp band 118 is placed on the crimp body 116. Additionally, a boot 302 is placed over the jacketed fiber optic cable 300, the crimp band 118, and the crimp body 116. See also FIG. 1. The assembly of the interface 100 and the adapter 200 may have external structures to allow the assembly to be supported in its location (e.g., data center) and not allow unnecessary stress and strain to be placed on the assembly. The assembly is not intended to be dangling or hanging from the jacketed fiber optic cables 300, although that type of configuration of the assembly is possible.

In an alternative embodiment, the two pieces 108,110 could be connected to one another along a portion of at least one wall 124,126, thereby give the main body 102 a clamshell configuration. The number of optical fibers that pass through the interface could be more or less than those illustrated in the figures, but in any event the fiber optic cable from which the optical fibers emerge would be strain-relieved.

Figure 9:
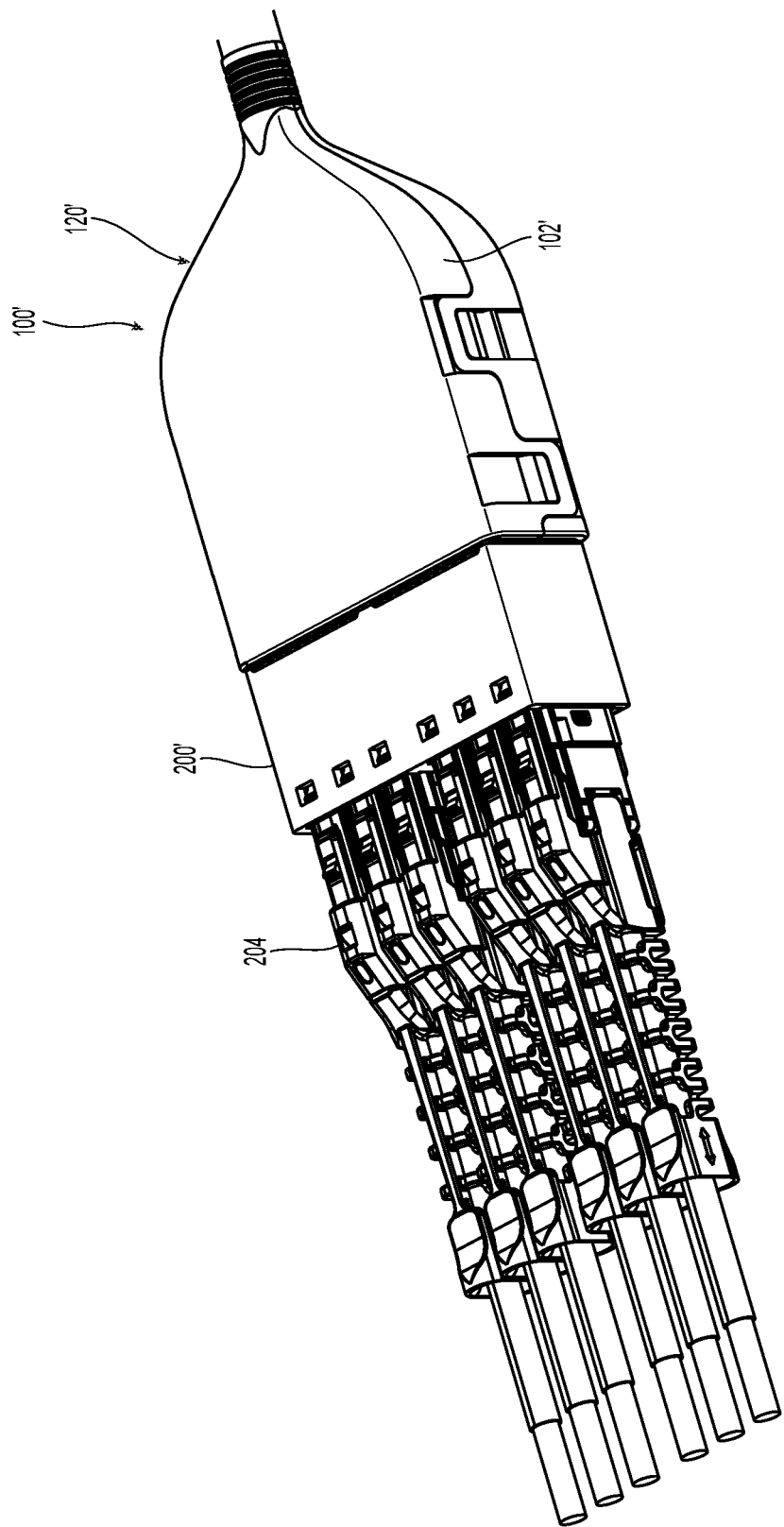
FIG. 9 is a top perspective view of another embodiment of an interface according to the present invention.
Figure 10:
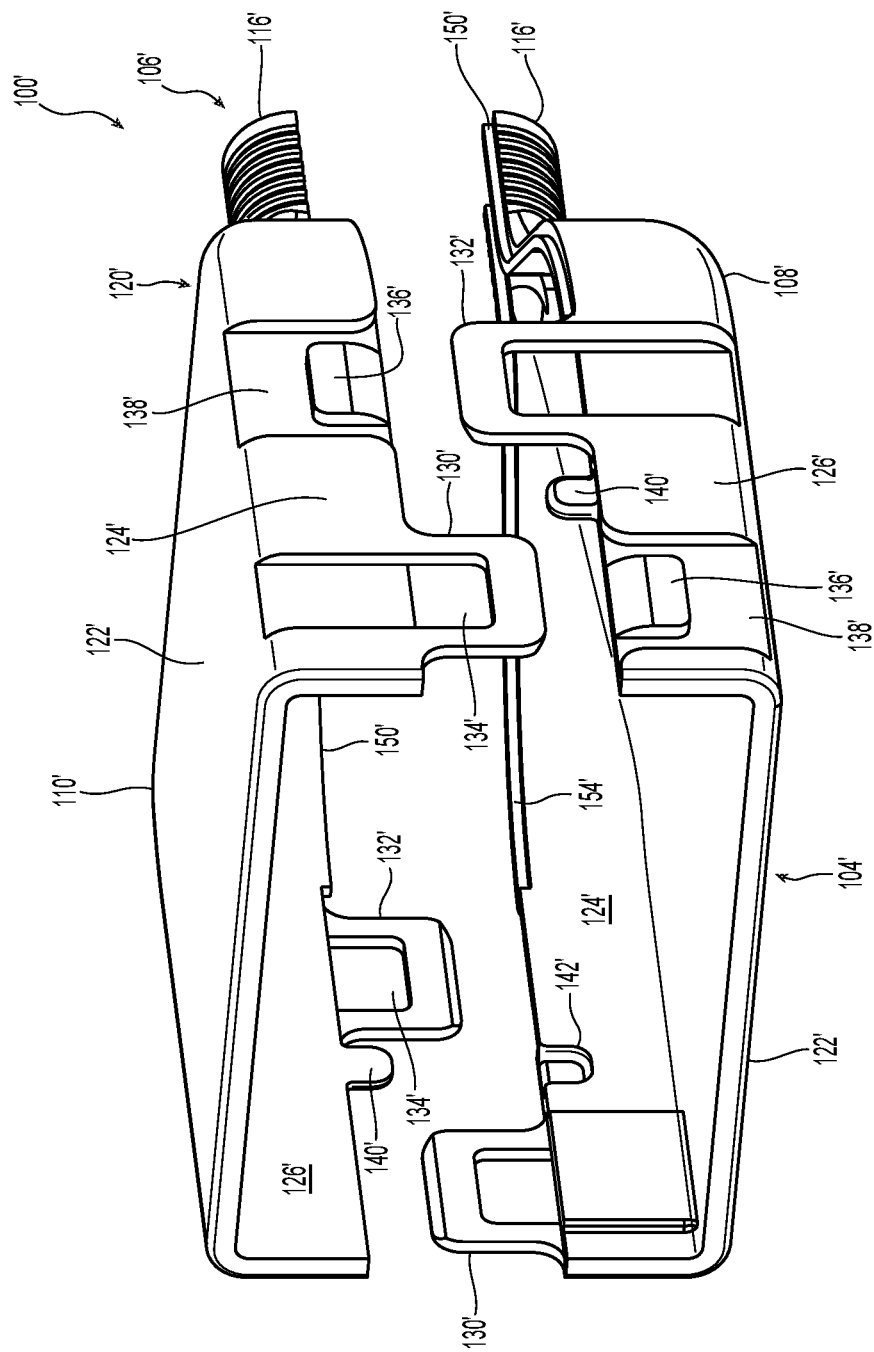
FIG. 10 is a perspective view of the interface of FIG. 9 separated into its two pieces.
Figure 11:
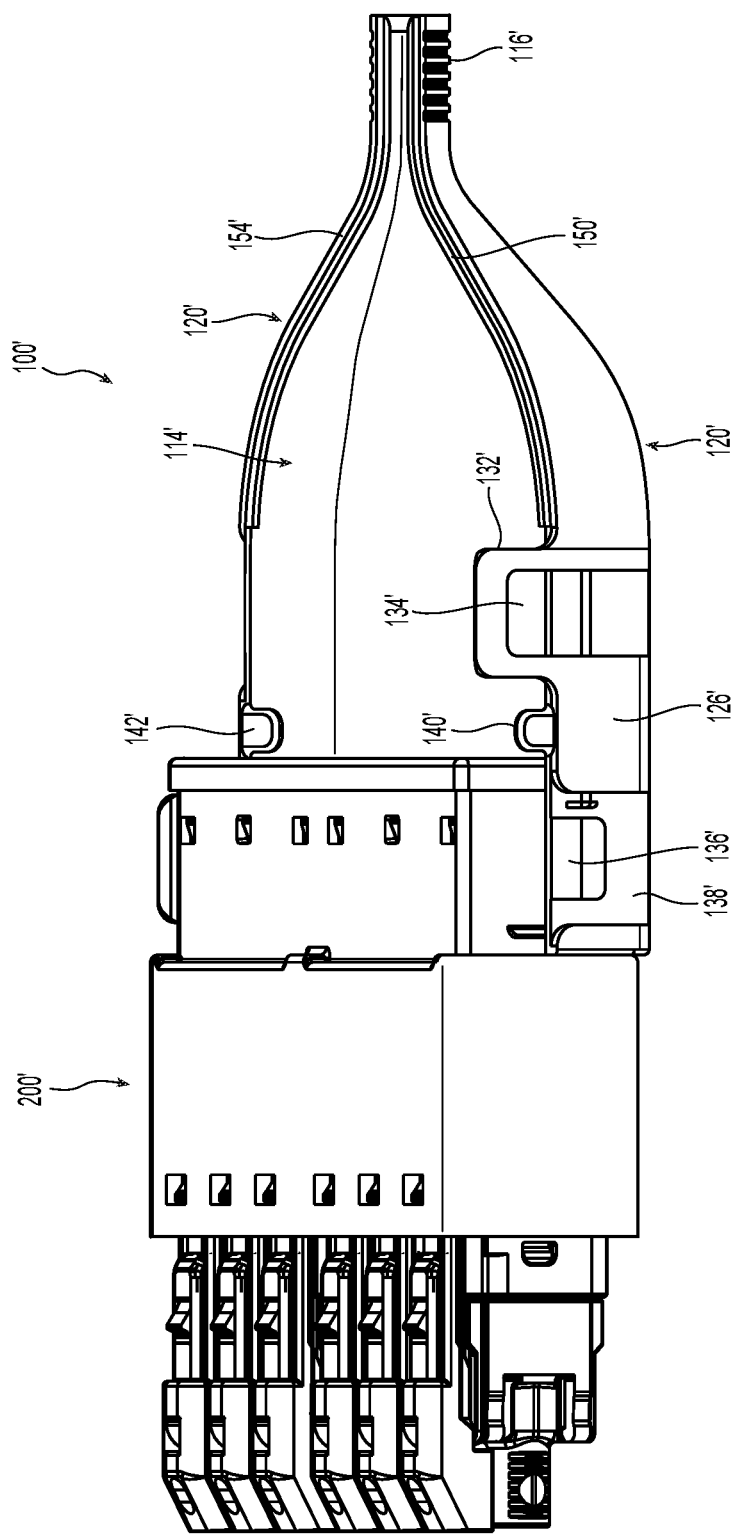
FIG. 11 is a perspective view of the interface in FIG. 9.

In another embodiment illustrated in FIGS. 9-11, there is interface 100' that has an adapter 200' with six sets of two-fiber connectors 204. Again, there could be more or fewer optical fibers and connections (e.g., single optical fiber connectors, duplex fiber optic connectors or other multi-fiber ferrule connectors). The interface 100' has a main body 102' that has a front end 104' mateable with the adapter 200 (see FIG. 1) and a back end 106' configured to receive the jacketed fiber optic cable 300. The main body 102' preferably comprises two pieces, a first piece 108' and a second piece 110'. Preferably the two pieces 108' and 110' have the same configuration—they are identical except that one is inverted and attached to the other. The interface 100' may attach to the adapter 200' by any means, including a latching mechanism as noted above or by an adapter clip illustrated in FIG. 11.

When the two pieces 108', 110' are connected to one another, as described in more detail below, they form an interior opening 114' extending between the front end 104' and the back end 106'. See FIG. 10. The back end 106' of the interface 100 also forms a crimp body 116'. The crimp body 116' is preferably round (when the two pieces 108', 110' are connected to one another) but may have any other functional shape (i.e., oval, hexagonal, etc.). Additionally, the crimp body 116' may be larger or smaller, depending on the number of jacketed fiber optic cables 300', the number of optical fibers in each of the jacketed fiber optic cables 300', etc. The crimp body 116' receives a crimp band (not shown but same as 118), which is crimped to the crimp body 116', to secure a strength member from the jacketed fiber optic cable 300' to the interface 100'. In this way, the crimp body 116' supports the jacketed fiber optic cable 300' at the back end 106' of the interface.

The interface 100' also has a transition area 120' disposed between the front end 104' and the back end 106' of the main body 102'. In this transition area 120', the optical fibers in the jacketed fiber optic cable 300' can be arranged and oriented to be connected with the appropriate fiber optic connector 204. Each of the first and second pieces 108',110' have a central portion 122' and two walls 124', 126' that are on opposite sides of the central portion 122'.

Each of the first and second pieces 108',110' have a first latch mechanism 130' and a second latch mechanism 132' that extend from the side walls 124',126'. Each of the latch mechanisms 130',132' are the same since each of the pieces 108',110' are the same. The latch mechanisms 130',132' extend from the side walls 124',126' (away from the central portion 122') have a generally u-shaped configuration that has an opening 134' to receive a projection 136' on the side walls 124',126' of the corresponding piece (either 108' or 110') of the main body 102'. See FIG. 9. As the first piece 108 is moved toward the second piece 110, the latch mechanisms 130,132 engage the projection 136' and flex outward until the projections 136' are received in the opening 134'. The two pieces 108',110' then form the main body 102' as illustrated in FIG. 9.

To assist in aligning the first and second pieces 108',110', the projections 136' are disposed in a recessed portion 138' on the side walls 124',126'. The recessed portions 138' on each of the first and second pieces 108',110' receive the latch mechanisms 130',132' and guide the two pieces 108',110' toward one another. Additionally, each of the first and second pieces 108',110' have a tab 140' and a tab recess 142' similar to the embodiment above. The tab 140' on each of the first and second pieces 108',110' fits within the tab recess 142' on the other piece. As illustrated in FIG. 10, the tabs 140' extend from the side wall 122' away from the central portion 120'. The tab recesses 142' are disposed in side walls 124' and are preferably open and in communication with the interior opening 114'. However, the tab recesses 142' could also be closed and separate from the interior openings 114'.

Each of the first and second pieces 108',110' have a recess 154' on the wall 124' and a projection 150' on the wall to assist in aligning the first and second pieces 108',110' as well as the walls 124', 126'. The projection 150 and recess 154' are preferably about half of the width of the walls 124', 126', but could have other dimensions and positions along the walls 124',126'.

In the transition area 120' of the interior opening 114' (as well as in the transition area 120 in interface 100), there is a ramp-type profile to support the optical fibers that are being routed in the interface 100' from the jacketed fiber optic cable 300. However, the transition areas 120/120' may also have a step profile, appropriately sized grooves or other support structures for the individual jacketed fiber optic cables 300.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An interface for transitioning a jacketed fiber optic cable to an adapter, the adapter configured to mate at least one pair of optical fibers, the interface comprising:
   a main body having a front end mateable with the adapter and a back end configured to receive the jacketed fiber optic cable, the main body having an interior opening extending between the front end and the back end;
   a crimp body disposed at the back end of the main body configured to support the jacketed fiber optic cable at the back end;
   a transition area disposed between the front end and the back end of the main body; and
   at least one latch opening disposed in the main body to receive at least one latch on the adapter to connect the interface to the adapter.

2. The interface according to claim 1, wherein the main body comprises a first piece and a second piece, the first piece and the second piece mateable to one another.

3. The interface according to claim 2, further comprising a first latch mechanism and a second latch mechanism on each of the first and second pieces, wherein the first latch mechanism faces away from the internal opening and second latch mechanism faces toward the internal opening.

4. The interface according to claim 2, wherein the first piece and the second piece are identical to one another.

5. The interface according to claim 2, wherein the first piece has a first tab recess and a first tab and the second piece has a second tab recess and a second tab, where in the second tab is aligned with the first tab recess and the first tab is aligned with the second tab recess.

6. The interface according to claim 1, wherein the main body is connected to the jacketed fiber optic cable with a crimp band over the crimp body.

7. The interface according to claim 1, further comprising a boot at least partially covering the crimp body and providing additional support to the jacketed fiber optic cable adjacent the back end of the main body.

8. An interface for transitioning a jacketed fiber optic cable to an adapter, the adapter configured to mate at least one pair of optical fibers, the interface comprising:
   a main body having a front end mateable with the adapter and a back end configured to receive the jacketed fiber optic cable, the main body having an interior opening extending between the front end and the back end and also having a first piece and a second piece, the first piece and the second piece mateable to one another;
   a crimp body disposed at the back end of the main body configured to support the jacketed fiber optic cable at the back end;
   a transition area disposed between the front end and the back end of the main body; and
   a first latch mechanism and a second latch mechanism on each of the first and second pieces, wherein the first latch mechanism faces away from the internal opening and second latch mechanism faces toward the internal opening.

9. The interface according to claim 8, wherein the first piece and the second piece are identical to one another.

10. The interface according to claim 8, wherein the first piece has a first tab recess and a first tab and the second piece has a second tab recess and a second tab, where in the second tab is aligned with the first tab recess and the first tab is aligned with the second tab recess.

11. The interface according to claim 8, wherein the main body is connected to the jacketed fiber optic cable with a crimp band over the crimp body.

12. The interface according to claim 8, further comprising a boot at least partially covering the crimp body and providing additional support to the jacketed fiber optic cable adjacent the back end of the main body.

\* \* \* \* \*